Webster & Bennett,
Sawing Stone.

N° 15,792. Patented Sep. 23, 1856.

UNITED STATES PATENT OFFICE.

ALONZO WEBSTER AND D. K. BENNETT, OF MONTPELIER, VERMONT.

MACHINE FOR SAWING MARBLE.

Specification of Letters Patent No. 15,792, dated September 23, 1856.

*To all whom it may concern:*

Be it known that we, ALONZO WEBSTER and D. K. BENNETT, of Montpelier, in the county of Washington and State of Vermont, have invented a new and useful machine for sawing tapering marble slabs, by which two or more saws may be run for that purpose at the same time; and we do hereby declare that the following is a full and exact description thereof, reference being had to the accompanying drawings and the letters of reference marked thereon.

Figure 1:
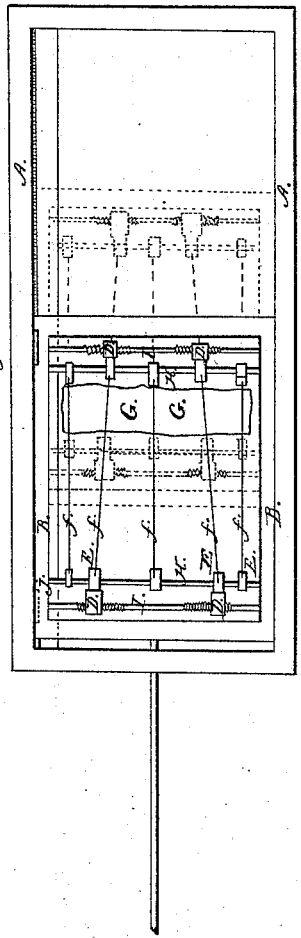
Figure 2:
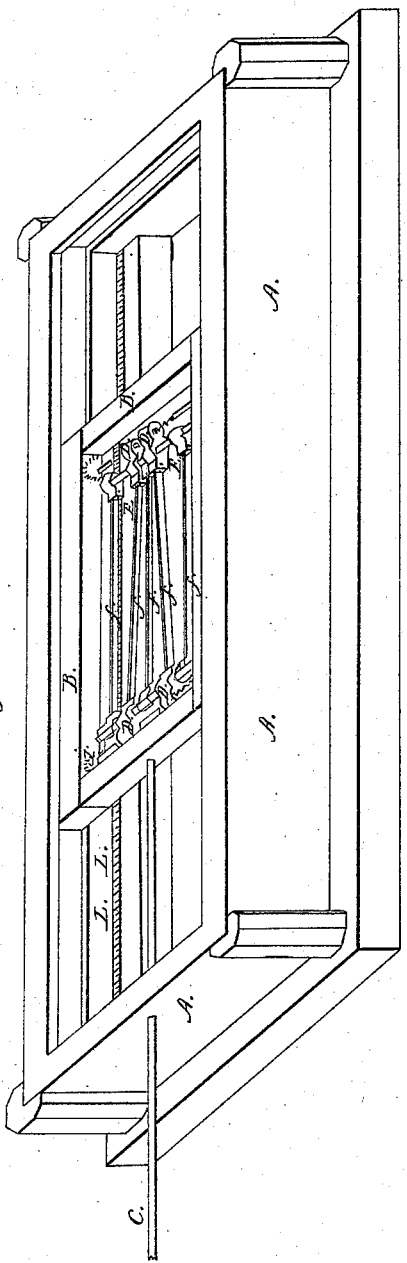

Of the said drawings, Figure 1 represents a horizontal section of the machine; Fig. 2, a perspective view of the same.

In the drawings A denotes the stationary wooden frame in which the saws run; B, the movable wooden frame that carries the saws; C, the shaft connected with the motive power; D, the movable saw stirrups; E, the screws upon the movable stirrups for the purpose of tightening the saws; F, the saws; G, the block of marble through which the saws run; H, the bars of iron running through and across each end of the wooden frame and through the movable saw stirrups, and permitting them to slide thereon.

I denotes the arbors placed in the rear of the iron bars H. Upon each of these arbors is cut a screw running to the right and left, and also passing through the rear of the movable saw stirrups.

J denotes the cog-wheels upon the arbors; L, the rack in which these cog-wheels run and are made to turn the arbors with the through movement of the saws. As two saws cannot be run wedging through a solid substance without a side movement corresponding to the through movement at each end of the saws, the revolution of these arbors as the saws are shoved through, acting by a screw upon the sliding or movable saw stirrups, gives precisely the requisite side motion to permit the free passage of the saws upon the required angle. In shoving the saws wedging through a solid substance the space between the saws continues to diminish by the inward movement of the saws, as the saws contract as they are shoved in and expand as they are drawn out. Fig. 1 shows the position of these saws, the marked surface their position when drawn out, and the dotted surface their position when shoved through the block of marble.

We have inserted upon our drawings three stationary saws to illustrate the number of marble slabs that may be cut by two movable saws connected with sliding stirrups as above described. More of these movable saws may be run in the gang if desired. Remove the middle stationary saw and the two movable saws would cut a block twice as tapering as now. These saws may be readily adjusted to cut narrower or wider by turning each arbor separately, but to cut more or less tapering there must be a change of the cog wheel, running one of a greater or less diameter or by making the worm of the screw upon the arbor coarser or finer.

This machine permits the running of a gang of saws when heretofore only one has been used.

We do not claim giving to the saws a lateral motion, by means of horizontal shafts, having right and left hand screws thereon; but

What we claim as our invention, and desire to secure by Letters Patent, is—

The combination, and arrangement of the movable stirrups D, cross bars H, and the arbors I, in the reciprocating frame B, as set forth.

ALONZO WEBSTER.
    D. K. BENNETT.

Witnesses:
 L. A. WEBSTER,
 EBENR. BICKFORD.